A. ELMENDORF.
FUSELAGE.
APPLICATION FILED JAN. 19, 1920.
1,338,564.
Patented Apr. 27, 1920.
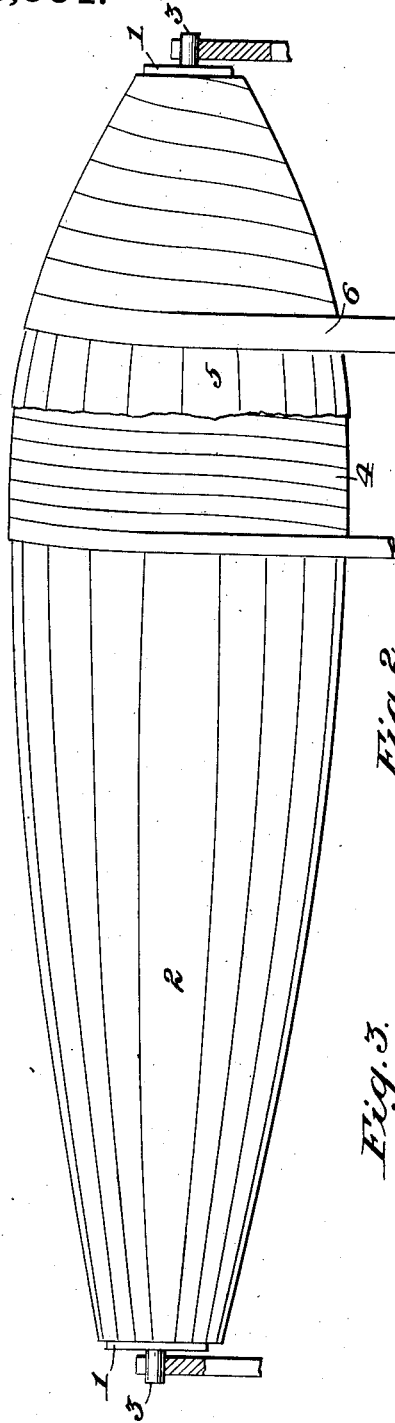
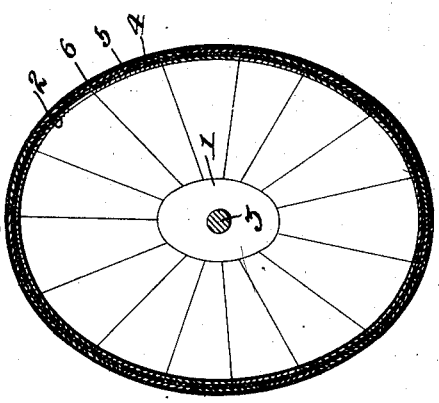
Inventor:
Armen Elmendorf
By Wm. L. Symons
Atty.

UNITED STATES PATENT OFFICE.

ARMIN ELMENDORF, OF MADISON, WISCONSIN.

FUSELAGE.

1,338,564.  Specification of Letters Patent.  Patented Apr. 27, 1920.

Application filed January 19, 1920. Serial No. 352,366.

*To all whom it may concern:*

Be it known that I, ARMIN ELMENDORF, a citizen of the United States of America, residing at Madison, in the county of Dane and State of Wisconsin, have invented certain new and useful Improvements in Fuselages, of which the following is a specification.

My invention relates to improvements in fuselages for aeroplanes, cars for dirigibles, and bodies for similar vehicles, composed of superposed plies of veneer and other materials.

An object of my invention is the construction of a plywood fuselage which is light and at the same time possesses the maximum resistance to stresses and to weaknesses resulting from atmospheric changes.

A further object of my invention is the construction of a fuselage of a form which will have the minimum resistance to the air.

A further object of my invention is the production of a fuselage having a balanced construction which results from having the grain of contiguous plies of veneer at right angles, which prevents distortion when the plies are subjected to changes of humidity of the atmosphere. I have found by experiment that plywood constructed of plies in which the grain of contiguous plies cross at an angle other than at substantially 90° is subject to serious warping due to the unbalanced distribution of the internal stresses set up by changes in moisture content.

A still further object is the production of a fuselage of plywood in which the grain of the longitudinal plies runs with the longitudinal axis of the fuselage, which is the direction of maximum stress, and in which the grain of the circumferential plies which are wound as a ribbon around the longitudinal plies runs at right angles to the grain of the longitudinal plies.

These and further objects are attained in the construction which I shall describe, this particular form of construction being selected merely to illustrate a method of fuselage construction.

Referring to the drawings,

Figure 1 is a side elevation of my fuselage body with the outer layers shown incomplete better to illustrate the construction.

Fig. 2 is a slightly enlarged vertical cross-section.

Fig. 3 is an enlarged fragmentary cross-section of a modified form of fuselage.

Fig. 4 is an enlarged fragmentary cross-section of another modified form of fuselage.

To build a fuselage body embodying my invention, I place on a collapsible mold 1 built on conventional stream line form, plies of veneer 2 cut with a proper taper and with the grain running longitudinally of the plies. I may use any of the low density woods such as spruce, white pine or redwood for all the veneer plies; however, other woods may be used. The joints of these plies may be scarfed, if desired, in the conventional manner. These plies may be of any convenient width, but I have found that plies two to four inches wide are practicable. In the fuselage construction illustrated, the veneer plies are all of substantially the same thickness, but the ratio of ply thickness may be varied to suit special bulkhead or other internal bracing.

To facilitate the handling of the work, the core may be mounted by means of trunnions 3 so that it may be turned on these trunnions as a drum. This first layer is then strapped to the core and is covered with glue, after which a second veneer ply 4 with the grain circumferential is wound on this first ply as a ribbon is wound on a spool, and is caused to set by pressure in the usual manner. The circumferential ply is now covered with glue as was the longitudinal ply and a second longitudinal ply 5 having the grain longitudinal is placed on the circumferential ply in the same manner as ply 1 was applied. This second longitudinal ply is now covered with glue and a tape 6 of cotton or other fabric is wrapped the entire length of the fuselage. The three plies and the tape covering may be strapped or clamped by any of the well-known means until the glue has firmly set, when the collapsible core may be removed.

Openings may be cut in the fuselage at the proper places for a pilot and an observer, if desired, and the front may be cut away in a manner to accommodate the engine used for motive power.

In the modified form of fuselage shown in Fig. 3, the manner of construction is the same as of the fuselage shown in Fig. 1. The inner layer 7 next to the mold consists of plies of veneer of the same character as plies 2. On this ply 7 after it has been covered with glue is wound a fabric covering 8 which is secured in the same manner as covering 6. After the covering 8 has been coated with glue, a veneer ply 9 with the grain circumferential is wound on. This ply is covered with glue and another fabric 10 is wound on and glued. To this covering a longitudinal ply 11 is attached in the same way as ply 5 and then covered with a fabric 12 the same as fabric 6.

In the modified form shown in Fig. 4, a fabric covering is not used except as the outer covering of the fuselage. In this form a longitudinal ply 13 is covered by a circumferential ply 14 which is covered by a longitudinal ply 15 which is followed by a circumferential ply 16 and then a longitudinal ply 17 which is covered with a fabric ply 18 similar to fabric covering 6.

Glue is applied and the plies are clamped to produce the fuselage shown in Figs. 3 and 4 in the same manner as to produce the fuselage illustrated in Fig. 1.

While I have illustrated a fuselage elliptical in cross-section, the major axis being vertical of the fuselage when it is placed in position to be used, I do not limit myself to this form of fuselage as other shapes may be made in accordance with my invention.

Having described my invention, what I claim is:

1. A fuselage comprising a hollow body formed of a plurality of veneer plies, the inner placed longitudinally, the second, circumferentially, and the third longitudinally of the fuselage.

2. A fuselage comprising a hollow body formed of a plurality of veneer plies, the inner placed longitudinally and having the grain of said inner ply running longitudinally of the fuselage, the second, circumferentially and having the grain of said second ply running circumferentially of the fuselage, and the third longitudinally of the fuselage and having the grain of said third ply running longitudinally of the fuselage.

3. A fuselage comprising a hollow body formed of a plurality of veneer plies glued together, the inner placed longitudinally and having the grain of said inner ply running longitudinally of the fuselage, the second, circumferentially and having the grain of said second ply running at an angle of approximately 90° to the grain of the inner ply, and the third, longitudinally of the fuselage and having the grain of said third ply running longitudinally of the fuselage.

4. A fuselage comprising a hollow body formed of a longitudinal layer consisting of veneer plies placed adjoining each other, a circumferential layer consisting of veneer plies wound as a continuous strip, the edges thereof adjoining each other, a longitudinal layer consisting of veneer plies adjoining each other, and a fabric tape placed circumferentially of the second longitudinal ply and extending the entire length of the fuselage and attached to said longitudinal ply.

5. A fuselage body comprising superposed strips of veneer glued together, the inner and the outer of said strips placed longitudinally of said body and having the grain substantially parallel with said strips, and the second and alternate inner strips wound circumferentially of the fuselage body, said second and alternate inner strips having the grain thereof substantially at right angles to the longitudinal axis of the fuselage.

In testimony whereof I affix my signature.

ARMIN ELMENDORF.